(12) United States Patent
Kishida et al.

(10) Patent No.: US 11,184,844 B2
(45) Date of Patent: Nov. 23, 2021

(54) USER TERMINAL AND CELL SELECTION METHOD

(71) Applicant: NTT DOCOMO, INC., Tokyo (JP)

(72) Inventors: Akira Kishida, Tokyo (JP); Yoshifumi Morihiro, Tokyo (JP); Takahiro Asai, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 181 days.

(21) Appl. No.: 16/487,544

(22) PCT Filed: Dec. 18, 2017

(86) PCT No.: PCT/JP2017/045377
§ 371 (c)(1),
(2) Date: Aug. 21, 2019

(87) PCT Pub. No.: WO2018/154938
PCT Pub. Date: Aug. 30, 2018

(65) Prior Publication Data
US 2019/0387467 A1 Dec. 19, 2019

(30) Foreign Application Priority Data
Feb. 23, 2017 (JP) .............................. JP2017-032475

(51) Int. Cl.
*H04W 48/20* (2009.01)
*H04W 24/10* (2009.01)
(Continued)

(52) U.S. Cl.
CPC .......... *H04W 48/20* (2013.01); *H04W 24/10* (2013.01); *H04W 36/08* (2013.01); *H04W 64/003* (2013.01); *H04W 88/06* (2013.01)

(58) Field of Classification Search
None
See application file for complete search history.

(56) References Cited

U.S. PATENT DOCUMENTS 3,574,464 A * 4/1971 Howland ........... G01M 11/0264
356/126
5,379,447 A * 1/1995 Bonta ................... H04W 36/30
455/437

(Continued)

FOREIGN PATENT DOCUMENTS

| JP | 2007-043573 A | 2/2007 |
| JP | 2008-187259 A | 8/2008 |
| JP | 2014232992 A | 12/2014 |

OTHER PUBLICATIONS

International Search Report issued in PCT/JP2017/045377 dated Feb. 20, 2018 (6 pages).

(Continued)

*Primary Examiner* — Andrew C Oh
(74) *Attorney, Agent, or Firm* — Osha Bergman Watanabe & Burton LLP (57) ABSTRACT

In user terminal 10 of the present invention, connection-cell-selection controlling section 110 measures reception quality of signals respectively transmitted from cells and received by antenna section 108, corrects the reception quality of each of the cells based on a positional relationship between each of the cells and user terminal 10 and based on a moving direction of user terminal 10, and determines a connection cell for user terminal 10 (base station in communication with user terminal 10) based on the corrected reception quality. This configuration lowers a cell switching frequency, while preventing degradation of throughput and the like in a future radio communication system (multilayer cellular radio network).

18 Claims, 5 Drawing Sheets

(51) Int. Cl.
*H04W 36/08* (2009.01)
*H04W 64/00* (2009.01)
*H04W 88/06* (2009.01)

(56) References Cited

U.S. PATENT DOCUMENTS

| | | | | |
|---|---|---|---|---|
| 5,483,669 | A * | 1/1996 | Barnett | H04W 36/00837 455/437 |
| 6,240,124 | B1 * | 5/2001 | Wiedeman | H04B 7/18543 375/130 |
| 6,362,783 | B1 * | 3/2002 | Sugiura | G01S 1/026 342/451 |
| 9,152,832 | B2 * | 10/2015 | Royston | H04B 5/0031 |
| 2003/0181163 | A1 * | 9/2003 | Ofuji | H04W 16/28 455/25 |
| 2003/0236096 | A1 * | 12/2003 | Yamazaki | H01Q 21/205 455/456.6 |
| 2005/0014515 | A1 * | 1/2005 | Suzuki | H04W 36/32 455/456.1 |
| 2005/0181832 | A1 * | 8/2005 | Ishii | H04W 36/06 455/562.1 |
| 2008/0137719 | A1 * | 6/2008 | Kawamoto | H04L 1/20 375/224 |
| 2008/0227454 | A1 * | 9/2008 | Damnjanovic | H04W 36/0058 455/436 |
| 2009/0175183 | A1 * | 7/2009 | Mochizuki | H04W 24/00 370/252 |
| 2010/0135445 | A1 * | 6/2010 | Sari | H04B 7/10 375/347 |
| 2010/0159950 | A1 * | 6/2010 | Toh | H04J 11/0086 455/456.1 |
| 2010/0316034 | A1 * | 12/2010 | Burbidge | H04W 36/14 370/338 |
| 2011/0143761 | A1 * | 6/2011 | Uusitalo | H04W 72/02 455/450 |
| 2011/0244862 | A1 * | 10/2011 | Inumaru | H04W 36/32 455/436 |
| 2011/0263257 | A1 * | 10/2011 | Kago | H04W 36/245 455/436 |
| 2012/0140667 | A1 * | 6/2012 | Nakayama | H04L 1/0026 370/252 |
| 2012/0329463 | A1 * | 12/2012 | Tajima | H04W 48/20 455/437 |
| 2013/0115950 | A1 * | 5/2013 | Kawasaki | H04W 36/00835 455/436 |
| 2013/0242941 | A1 * | 9/2013 | Ebesu | H04W 36/00 370/331 |
| 2013/0344874 | A1 * | 12/2013 | Kim | H04W 28/0289 455/438 |
| 2014/0120947 | A1 * | 5/2014 | Siomina | G01S 5/0221 455/456.1 |
| 2014/0141785 | A1 * | 5/2014 | Wang | H04W 36/32 455/441 |
| 2014/0179320 | A1 * | 6/2014 | Jang | H04W 48/20 455/436 |
| 2014/0364155 | A1 * | 12/2014 | Iwai | H04W 88/02 455/458 |
| 2015/0078279 | A1 * | 3/2015 | Ko | H04W 76/14 370/329 |
| 2015/0208248 | A1 * | 7/2015 | Wang | H04L 5/0073 455/446 |
| 2015/0223132 | A1 * | 8/2015 | Uemura | H04L 25/0224 455/436 |
| 2015/0331511 | A1 * | 11/2015 | Jeong | G06F 3/041 345/174 |
| 2016/0142957 | A1 * | 5/2016 | Hu | H04W 48/20 370/331 |
| 2016/0255550 | A1 * | 9/2016 | Narita | H04W 36/36 455/67.11 |
| 2016/0323912 | A1 * | 11/2016 | Nakamura | H04L 1/0016 |
| 2017/0034799 | A1 * | 2/2017 | Kim | H04W 56/003 |
| 2017/0048729 | A1 * | 2/2017 | Jin | H04W 24/02 |
| 2017/0048784 | A1 * | 2/2017 | Mackenzie | H04W 36/0061 |
| 2017/0063704 | A1 * | 3/2017 | Krinsky | H04B 17/309 |
| 2017/0208600 | A1 * | 7/2017 | Hsu | H04L 27/0014 |
| 2017/0223572 | A1 * | 8/2017 | Lee | H04W 28/08 |
| 2017/0289991 | A1 * | 10/2017 | Axmon | H04W 72/048 |
| 2018/0192426 | A1 * | 7/2018 | Ryoo | H04W 72/085 |
| 2018/0212800 | A1 * | 7/2018 | Park | H04L 25/03006 |
| 2018/0227579 | A1 * | 8/2018 | Shen | H04N 19/124 |
| 2018/0249435 | A1 * | 8/2018 | Yu | H04W 4/023 |
| 2019/0215044 | A1 * | 7/2019 | Noh | H04B 7/0626 |
| 2019/0239238 | A1 * | 8/2019 | Calabrese | H04W 24/08 |
| 2019/0394696 | A1 * | 12/2019 | Mochizuki | H04W 36/22 |
| 2020/0252879 | A1 * | 8/2020 | Palenius | H04W 52/143 |
| 2020/0275363 | A1 * | 8/2020 | Fujishiro | H04W 36/0083 |
| 2020/0314838 | A1 * | 10/2020 | Maeda | H04W 52/40 |

OTHER PUBLICATIONS

Written Opinion of the International Searching Authority issued in PCT/JP2017/045377 dated Feb. 20, 2018 (4 pages).

3GPP TS 25.133 V9.4.0; "3rd Generation Partnership Project; Technical Specification Group Radio Access Network; Requirements for support of radio resource management (FDD) (Release 9)"; Jun. 2010 (249 pages).

Office Action issued in Japanese Application No. 2017-032475; Dated Jan. 26, 2021 (5 pages).

* cited by examiner

FIG. 1

| SURROUNDING CELL ID | CELL LAYER/RAT | MEASURED SINR [dB] | CELL DIRECTION ANGLE [°] | CORRECTION VALUE [dB] | CORRECTED SINR [dB] | CONNECTED CELL | FINAL CONNECTION TARGET |
|---|---|---|---|---|---|---|---|
| C1 | L-SHF | 10 | 50 | 0 | 10 | | |
| C2 | LTE | 13 | 120 | -10 | 3 | ○ | |
| C3 | H-SHF | 21 | 12 | 0 | 21 | | ○ |
| C4 | EHF | 15 | 175 | -10 | 5 | | |
| C5 | Wi-Fi | 28 | 146 | -10 | 18 | | |
| C6 | LTE | 27 | 118 | -10 | 17 | | |
| C7 | WiGig | 8 | 80 | 0 | 8 | | |

USER TERMINAL AND CELL SELECTION METHOD

TECHNICAL FIELD

The present invention relates to a user terminal and a cell selection method in a next-generation mobile communication system.

BACKGROUND ART

Long Term Evolution (LTE) has been specified for achieving a higher data rate, lower latency, and the like in a Universal Mobile Telecommunications System (UMTS) network (see Non-Patent Literature (hereinafter referred to as "NPL") 1). Successor systems of LTE have been also studied for achieving a broader bandwidth and a higher speed based on LTE. Examples of successor systems of LTE include the systems called LTE-A (LTE-Advanced), FRA (Future Radio Access), 5G (5th generation mobile communication system), 5G+ (5G plus), and New-RAT (Radio Access Technology)).

An operation of a "multilayer cellular" radio network, in which a plurality of radio access technologies (RATs), such as cellular communication, wireless LAN, and the like, are overlaid to constitute an area, has been studied for the future radio communication system (for example, 5G).

Since used frequency bands, coverage, communications protocols, and the like of RATs differ from each other in a multilayer cellular radio network, more control signals need to be transmitted in cell switching (handover) compared to the case of an existing cellular-communication radio network, resulting in an increase in overhead.

For this reason, frequent cell switching causes a significant reduction in communication quality due to the increased control signals. Therefore, it is desirable to reduce the cell switching frequency in multilayer cellular radio networks.

In an existing cellular-communication radio network, a connection cell for a user terminal is selected using a parameter indicating reception quality, such as a reference signal received power (RSRP) or reference signal received quality (RSRQ), signal noise interference ratio (SINR), or the like (see NPL 1).

CITATION LIST

Non-Patent Literature

NPL 1
3GPP TS 25.133 V9.4.0 (2010-06), "3rd Generation Partnership Project; Technical Specification Group Radio Access Network; Requirements for support of radio resource management"

SUMMARY OF INVENTION

Technical Problem

However, in a case where a connection cell for a user terminal is selected only using a parameter indicating reception quality in multilayer cellular radio networks, the user terminal moves out of the coverage of the cell immediately depending on the state of movement of the user terminal, so that the cell switching frequency increases.

Moreover, controlling to reduce the cell switching frequency only by setting a lower threshold of the broadcast channel (BCH) reception quality, which serves as a ground of determination of whether or not cell switching is necessary, causes the user terminal to stay for a long time in one cell for which the reception quality is degraded, so as to degrade the throughput and time property of traffic forwarding flow.

In an aspect of the present invention, a new configuration in which a cell switching frequency can be lowered, while degradation of throughput and the like are prevented in a future radio communication system (multilayer cellular radio network) is provided.

Solution to Problem

A user terminal according to an aspect of the present invention communicates with any of a plurality of base stations respectively forming cells in a multilayer cellular radio network, and includes: a reception quality measuring section configured to measure reception quality of each of the cells; a reception quality correcting section configured to correct the reception quality of each of the cells based on a positional relationship between each of the cells and the user terminal and based on a moving direction of the user terminal; and a connection cell determining section configured to determine a connection cell for the user terminal based on the corrected reception quality.

A cell selection method according to an aspect of the present invention is a method for a user terminal configured to communicate with any of a plurality of base stations respectively forming cells in a multilayer cellular radio network, and includes: measuring reception quality of each of the cells; correcting the reception quality of each of the cells based on a positional relationship between each of the cells and the user terminal and based on a moving direction of the user terminal; and determining a connection cell for the user terminal based on the corrected reception quality.

Advantageous Effects of Invention

According to an aspect of the present invention, a cell switching frequency can be lowered, while degradation of throughput, time property of traffic forwarding flow, and the like are prevented in a future radio communication system.

DESCRIPTION OF EMBODIMENTS

Hereinafter, embodiments of the present invention will be described in detail with reference to the accompanying drawings.

[Configuration of User Terminal]

Figure 1:
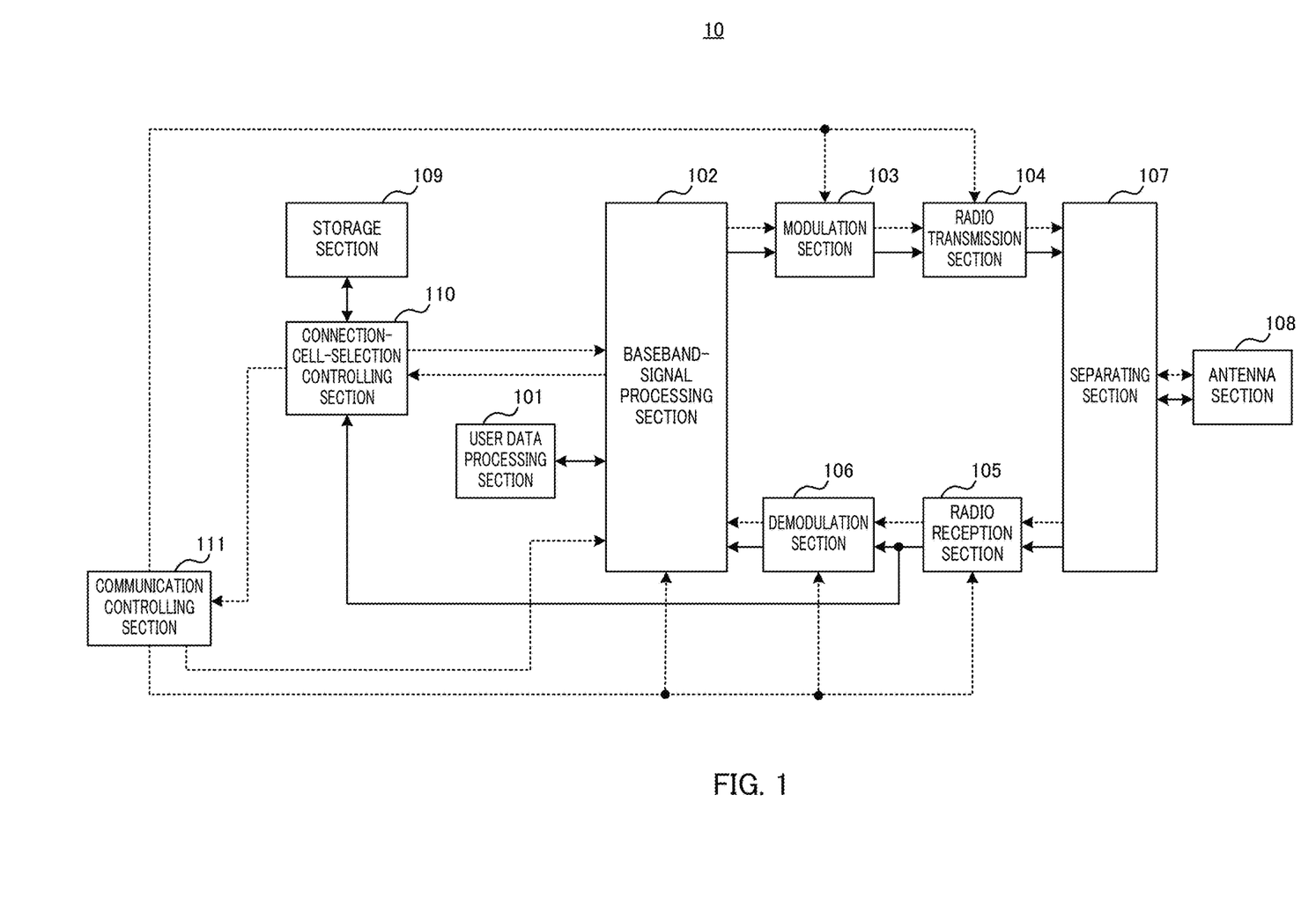
FIG. 1 is a block diagram showing a configuration of a user terminal.

FIG. 1 is a block diagram showing a configuration of user terminal (hereinafter, simply referred to as "terminal") 10 according to an embodiment of the present invention. Note that, control information is represented by the dotted line and user data by the solid line in FIG. 1.

In FIG. 1, terminal 10 includes user data processing section 101, baseband-signal processing section 102, modulation section 103, radio transmission section 104, radio reception section 105, demodulation section 106, separating section 107, antenna section 108, storage section 109, connection-cell-selection controlling section 110, and communication controlling section 111.

User data processing section 101 outputs user data output from baseband-signal processing section 102 to a corresponding application processing section (not illustrated). User data processing section 101 also outputs user data output from the application processing section to baseband-signal processing section 102.

Baseband-signal processing section 102 performs baseband processing (combining, encoding, and the like) to various kinds of control information, such as control information indicating ID of a connection cell output from connection-cell-selection controlling section 110, and to user data output from user data processing section 101, and baseband-signal processing section 102 outputs the obtained baseband signal to modulation section 103. In addition, baseband-signal processing section 102 performs baseband processing (separating, decoding, and the like) to a baseband signal output from demodulation section 106, and outputs the obtained control information to connection-cell-selection controlling section 110 and the obtained user data to user data processing section 101.

Modulation section 103 modulates the baseband signal output from baseband-signal processing section 102, and outputs the modulated signal to radio transmission section 104.

Radio transmission section 104 performs radio transmission processing (upconversion, amplification, and the like) to the modulated signal output from modulation section 103, and outputs the radio signal to separating section 107.

Radio reception section 105 performs radio reception processing (downconversion, amplification, and the like) to a radio signal output from separating section 107, and outputs the modulated signal to demodulation section 106 and connection-cell-selection controlling section 110.

Demodulation section 106 demodulates the modulated signal output from radio reception section 105, and outputs the baseband signal to baseband-signal processing section 102.

Separating section 107 outputs the radio signal (transmission signal) output from radio transmission section 104 to antenna section 108. In addition, separating section 107 extracts a signal addressed to the terminal (terminal 10) from among radio signals (reception signals) received by antenna section 108, and outputs the extracted radio signal to radio reception section 105.

Antenna section 108 transmits the radio signal output from separating section 107. In addition, antenna section 108 receives a radio signal transmitted from a connection cell (radio base station (hereinafter, simply referred to as "base station") in communication with terminal 10), and outputs the radio signal to separating section 107.

Figure 2:
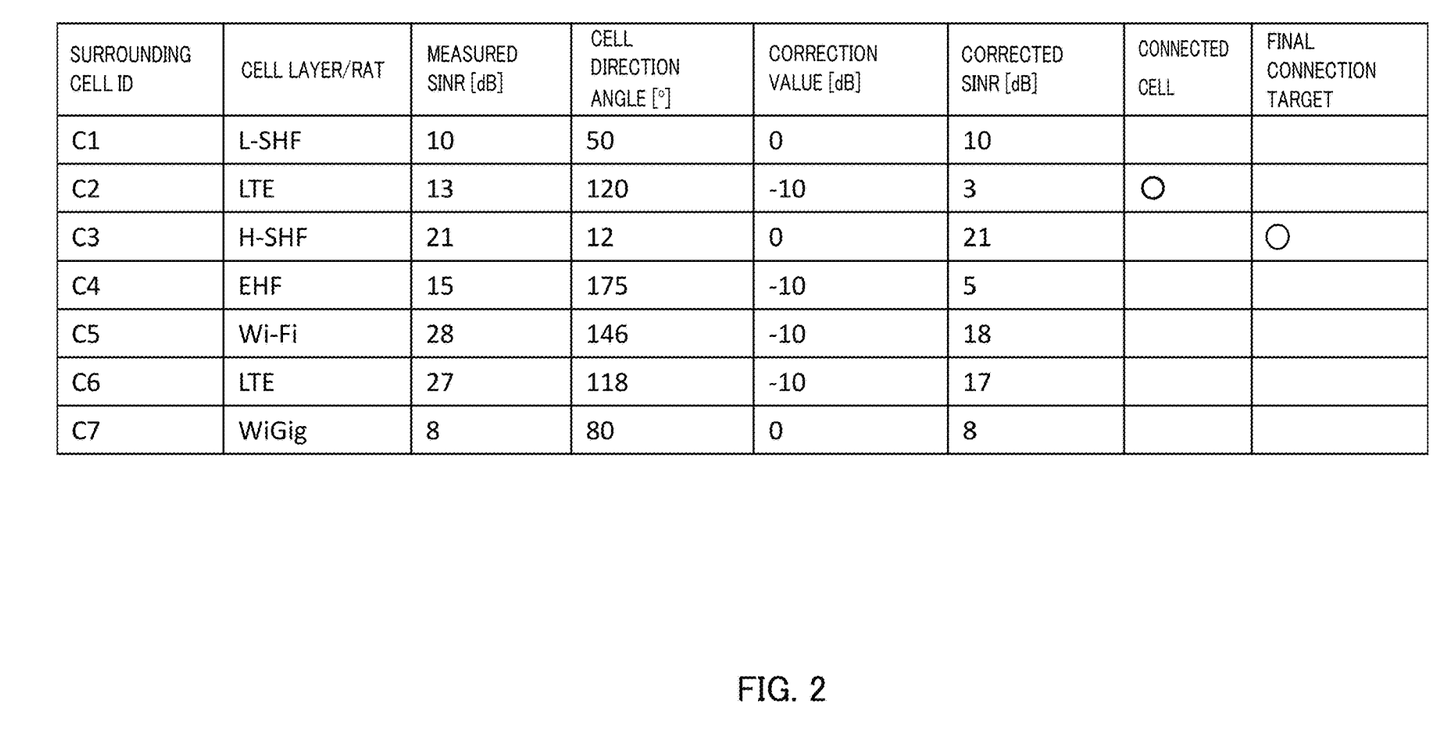
FIG. 2 illustrates an exemplary table stored in a storage section of the user terminal.

Storage section 109 stores information concerning surrounding cells that is necessary for connection-cell-selection controlling section 110 to select a connection cell. Examples of the information concerning the surrounding cells include a surrounding cell ID, cell layer/RAT, measured SINR, cell direction angle, correction value, corrected SINR, connected cell flag, and the like as indicated in the table of FIG. 2. The description of the embodiment of the present invention concerns a case where the data in the table in FIG. 2 are updated at all times and a connection cell is determined based on the data in the table (specifically corrected SINR) when cell switching is performed.

Connection-cell-selection controlling section 110 measures the reception quality of signals (for example, BCHs) respectively transmitted from cells, corrects the reception quality of each of the cells based on the positional relationship between each of the cells and terminal 10 and based on the moving direction of terminal 10, and determines a connection cell for terminal 10 (base station in communication with terminal 10) based on the corrected reception quality. When connection-cell-selection controlling section 110 selects a new cell, connection-cell-selection controlling section 110 outputs the control information indicating ID of the cell to baseband-signal processing section 102 and communication controlling section 111.

Communication controlling section 111 sets a communication system based on the connection cell selected by connection-cell-selection controlling section 110, and controls each of the sections of terminal 10 (baseband-signal processing section 102, modulation section 103, radio transmission section 104, radio reception section 105, and demodulation section 106). The communication system includes, for example, a communication system, communicating direction in beamforming, radio resource (modulation scheme, frequency resource, transmission power, transmission timing), and the like.

[Internal Configuration of Connection-cell-selection Controlling Section]

Figure 3:
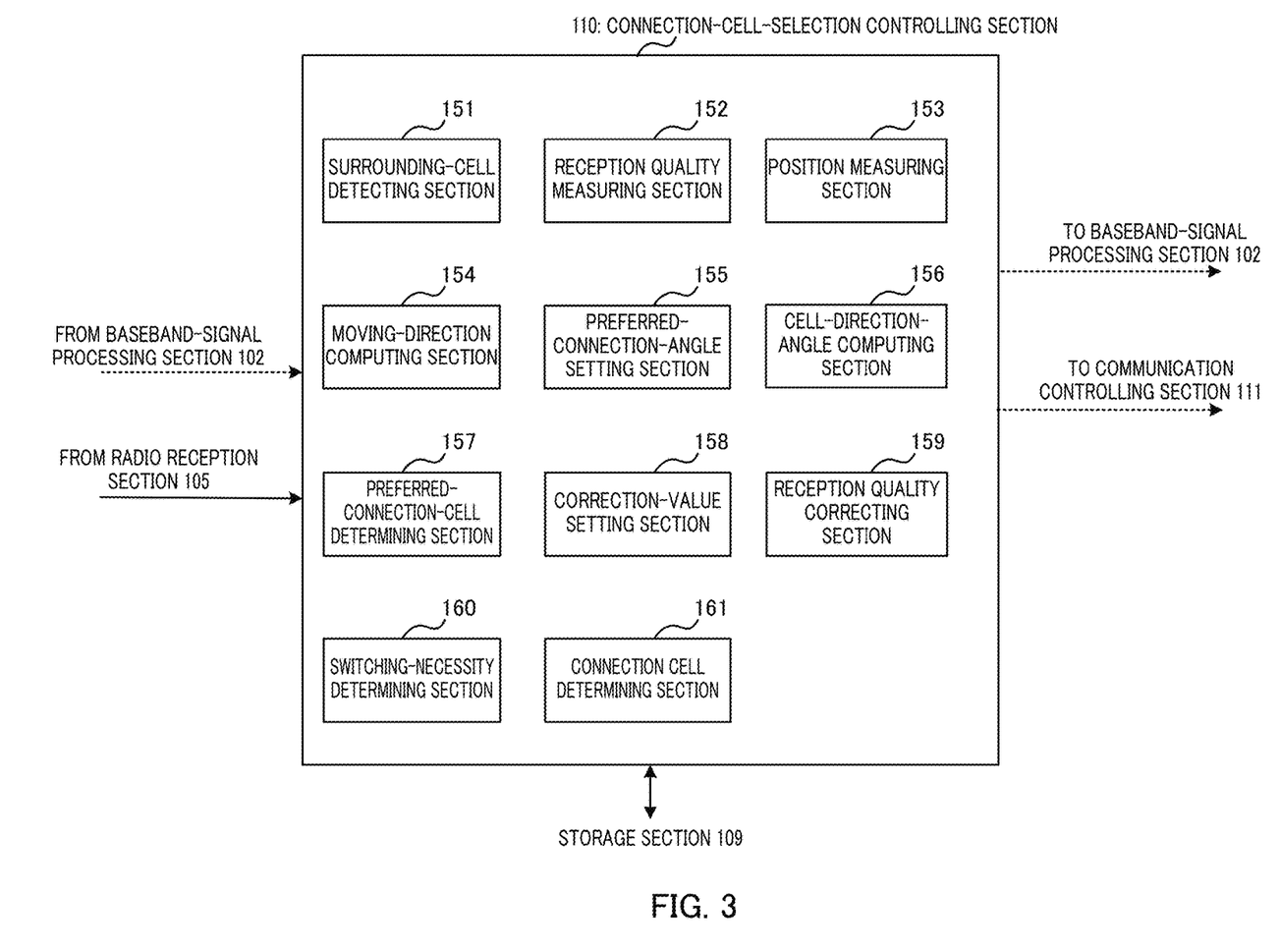
FIG. 3 illustrates an internal configuration of a connection-cell-selection controlling section of the user terminal.

FIG. 3 is a block diagram illustrating an exemplary internal configuration of connection-cell-selection controlling section 110. Connection-cell-selection controlling section 110 includes surrounding-cell detecting section 151, reception quality measuring section 152, position measuring section 153, moving-direction computing section 154, preferred-connection-angle setting section 155, cell-direction-angle computing section 156, preferred-connection-cell determining section 157, correction-value setting section 158, reception quality correcting section 159, switching-necessity determining section 160, and connection cell determining section 161.

Surrounding-cell detecting section 151 extracts ID and a layer/RAT of each of the surrounding cells contained in the control information output from baseband-signal processing section 102, and writes them in the respective columns of surrounding-cell ID and cell layer/RAT of the table in FIG. 2. Note that the surrounding cells include a connected cell (base station currently in communication with the terminal) and a cell to be a candidate for a new connection target during cell switching.

Reception quality measuring section 152 measures the reception quality of a signal transmitted from each of the surrounding cells using the output signal from radio reception section 105. Examples of parameters indicating the reception quality include RSRP, RSRQ, path loss (propagation loss), SINR, and the like. In the embodiment of the present invention, the SINR is used as the parameter indicating the reception quality.

Reception quality measuring section 152 writes the measured SINR of each of the surrounding cells in the column of measured SINR of the table in FIG. 2.

Position measuring section 153 measures a current position of the terminal (terminal 10) using reception levels or reception timings of signals (output signals from radio reception section 105) transmitted from the surrounding cells on terminal position measurement cycle a. The smaller the cell radius is, the higher the position estimation accuracy is, in a case where the reception timing is used. The higher the reception level is, the higher the position estimation accuracy is, in a case where the reception level is used.

Note that the method of measuring the position of terminal 10 is not limited in the embodiment of the present invention. For example, in a case where terminal 10 includes a function of receiving a signal (hereinafter referred to as "satellite signal") from an artificial satellite (not illustrated) using a global navigation satellite system (GNSS), position measuring section 153 may measure the current position of the terminal using the satellite signal. Note that the GNSS is a general term for a satellite navigation system having performances (accuracy and reliability) allowing the system to be used in civil aviation navigation, such as a global positioning system (GPS), GLONASS, Galileo, and the like.

Position measuring section 153 may also measure the current position of the terminal using other methods, such as IMES (Indoor MEssaging System (indoor position measurement)), autonomous navigation, gyro sensor, and the like.

Figure 4:
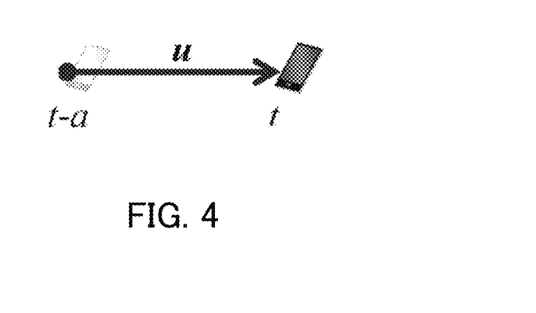
FIG. 4 is an explanatory view illustrating a method for computing a moving-direction vector of the user terminal.

As illustrated in FIG. 4, moving-direction computing section 154 computes moving-direction vector u of the terminal, which is a vector from the position of the terminal at time (t-a) to the position of the terminal at present time t, these positions being measured by position measuring section 153.

Figure 5:
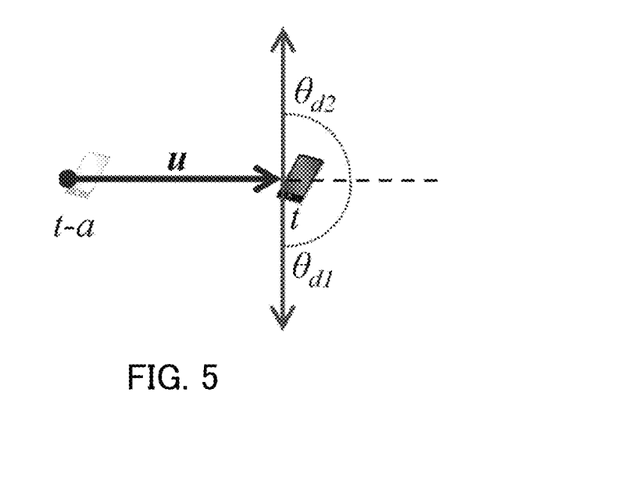
FIG. 5 is an explanatory view illustrating a method for setting a preferred connection angle of the user terminal.

Preferred-connection-angle setting section 155 sets a preferred connection angle range ($\theta_{d1}$ to $\theta_{d2}$) including moving-direction vector u, within which a cell to be preferentially selected as a connection target exists. For example, as illustrated in FIG. 5, preferred-connection-angle setting section 155 sets the origin to the position of the terminal at time (present time) t, threshold minimum angle $\theta_{d1}$ to −90 degrees from direction x of moving-direction vector u, and threshold maximum angle $\theta_{d2}$ to +90 degrees from direction x of moving-direction vector u, and preferred-connection-angle setting section 155 sets the angle range of from $\theta_{d1}$ to $\theta_{d2}$ (±90 degrees) as the preferred connection angle range.

Note that the method of setting the preferred connection angle is not limited in the embodiment of the present invention. For example, preferred-connection-angle setting section 155 may also set any preferred connection angle based on applied data. Alternatively, preferred-connection-angle setting section 155 may set a preferred connection angle by constructing a feedback loop of a reported angle of a preferred connection angle to be set and parameters related to a transmission rate and by applying an optimization algorithm, such as a steepest descent method.

Figure 6:
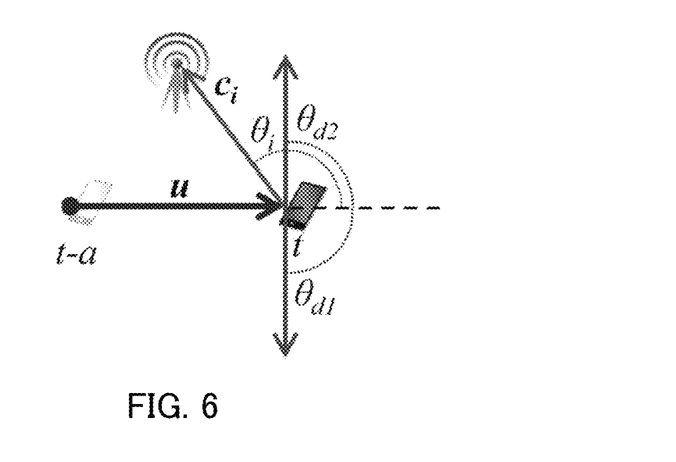
FIG. 6 is an explanatory view illustrating a method for computing a cell direction angle of the user terminal.

Cell-direction-angle computing section 156 computes, for each of the surrounding cells, cell direction angle $74_i$ formed by cell direction vector $c_i$, which extends from the position of the terminal at time t to the position of cell i, and moving-direction vector u, as illustrated in FIG. 6.

Note that, in the embodiment of the present invention, cells may appropriately notify terminal 10 with information on the position of each of the cells in order for cell-direction-angle computing section 156 to compute the cell direction angle. Alternatively, cell-direction-angle computing section 156 may also estimate a radio-wave arrival angle using beamforming, such as Massive MIMO (Multiple Input Multiple Output), adaptive array, and the like to thereby compute cell direction angle $74_i$ based on the radio-wave arrival angle.

Preferred-connection-cell determining section 157 determines, as a preferred connection cell, a cell for which cell direction angle $74_i$ falls within the preferred connection angle range ($\theta_{d1}$ to $\theta_{d2}$), and determines other cells as non-preferred connection cell. For example, preferred-connection-cell determining section 157 determines that cell i illustrated in FIG. 6 is the non-preferred connection cell since cell direction angle $74_i$ is greater than threshold maximum angle $\theta_{d2}$ of the preferred connection angle range and is outside the preferred connection angle range ($\theta_{d1}$ to $\theta_{d2}$).

Correction-value setting section 158 sets a correction value (offset value) for the SINR (reception quality), and writes the correction value in the column of the correction value of the table in FIG. 2 so that a preferred connection cell should be preferentially selected as a connection target. In the example of FIG. 2, correction-value setting section 158 writes a correction value of "0 dB" with respect to the preferred connection cells, and writes a correction value of "−10 dB" with respect to the non-preferred connection cells. In this case, since the correction value (offset) for reducing the reception quality is set with respect to the non-preferred connection cells, the preferred connection cells are relatively preferentially selected as a connection target.

Reception quality correcting section 159 adds, for each of the surrounding cells, the correction value written in by correction-value setting section 158 to the measured SINR written in by reception quality measuring section 152 so as to compute a corrected SINR and write the corrected SINR in the column of the corrected SINR of the table in FIG. 2.

Switching-necessity determining section 160 determines that cell switching (handover) is necessary, when the measured SINR of the connected cell (cell whose cell ID is C2 in the example of FIG. 2) is equal to or smaller than the threshold (for example, 15 dB).

Connection cell determining section 161 determines a new connection cell based on the corrected SINR when cell switching is necessary. In the example of FIG. 2, connection cell determining section 161 determines the cell whose cell ID is C3 as a new connection cell since the corrected SINR of the cell whose cell ID is C3 is the highest.

The above is the exemplary internal configuration of connection-cell-selection controlling section 110.

<Effect>

As described above, in the embodiment of the present invention, the reception quality of each of the cells is corrected based on the positional relationship of each of the cells and the user terminal and based on the moving direction of the user terminal, and the connection cell for the user terminal is selected using the parameter indicating the corrected reception quality. This configuration makes it possible to avoid that the user terminal moves out of the coverage of the connection cell immediately after connection with the new cell, so that the cell switching frequency can be lowered, while degradation of throughput and the like are prevented.

Note that, while the example of FIG. 2 illustrates the case where the correction value for reducing the reception quality is set with respect to the non-preferred connection cells, the embodiment of the present invention is not limited thereto, and a correction value for increasing the reception quality may be set with respect to the preferred connection cells.

<Example of Extended Control 1>

In an embodiment of the present invention, correction-value setting section 158 may also be configured not to set a correction value for reducing the reception quality with respect to the connected cell or may be configured to set a correction value for increasing the reception quality with respect to the connected cell even if the connected cell is a non-preferred connection cell.

With this configuration, communication with the connected cell is maintained when the reception quality of another cell which is the highest reception quality is almost the same as the reception quality of the connected cell, so that the cell switching frequency can be lowered.

<Example of Extended Control 2>

In an embodiment of the present invention, correction-value setting section 158 may be configured to set a correction value for reducing the reception quality with respect to cells whose cell layers (RAT) are different from that of the connected cell or may be configured not to set a correction value for increasing the reception quality with respect to cells whose cell layers (RAT) are different from that of the connected cell even when these cells are a preferred connection cell.

This configuration makes it possible to lower the frequency of cell switching across cell layers, and thereby to prevent an increase in overhead.

<Example of Extended Control 3>

In an embodiment of the present invention, preferred-connection-angle setting section 155 may set the size of the preferred connection angle range depending on a cell layer coverage size. In addition, correction-value setting section 158 may change parameters, such as a range of correction value and the like, or cell selection algorithms, such as a method for applying a correction value, depending on a cell layer. For example, a configuration may be possible in which preferred-connection-angle setting section 155 broadens the preferred connection angle range with respect to a cell whose layer has coverage greater than a threshold, such as a macro cell, and correction-value setting section 158 does not set a correction value for reducing the reception quality or sets a correction value for increasing the reception quality with respect to such a cell even when this cell is a non-preferred connection cell.

This configuration makes it possible for the terminal to be preferentially connected to a cell having greater coverage, so that the cell switching frequency can be lowered.

<Example of Extended Control 4>

In an embodiment of the present invention, correction-value setting section 158 may set a correction value depending on the attributes of terminal 10. The attributes of terminal 10 include a moving speed (magnitude of moving-direction vector of terminal 10), used service application, number of times of handovers within a certain period (in/out of a cell layer), and the like. For example, correction-value setting section 158 sets a greater range of correction value with respect to terminal 10 having a moving speed greater than a threshold, terminal 10 having QoS (Quality of Service) higher than a threshold, or terminal 10 for which the number of times of handovers within a certain period is fewer than a threshold.

This configuration makes it possible to set a feedback loop for adaptation of control.

The embodiments according to one aspect of the present disclosure have been described above.

(Hardware Configuration)

Note that the block diagrams used to describe the embodiments illustrate blocks on the basis of functions. These functional blocks (constituent sections) are implemented by any combination of hardware and/or software. A means for realizing the functional blocks is not particularly limited. That is, the functional blocks may be implemented by one physically and/or logically coupled apparatus. Two or more physically and/or logically separated apparatuses may be directly and/or indirectly (for example, wired and/or wireless) connected, and the plurality of apparatuses may implement the functional blocks.

Figure 7:
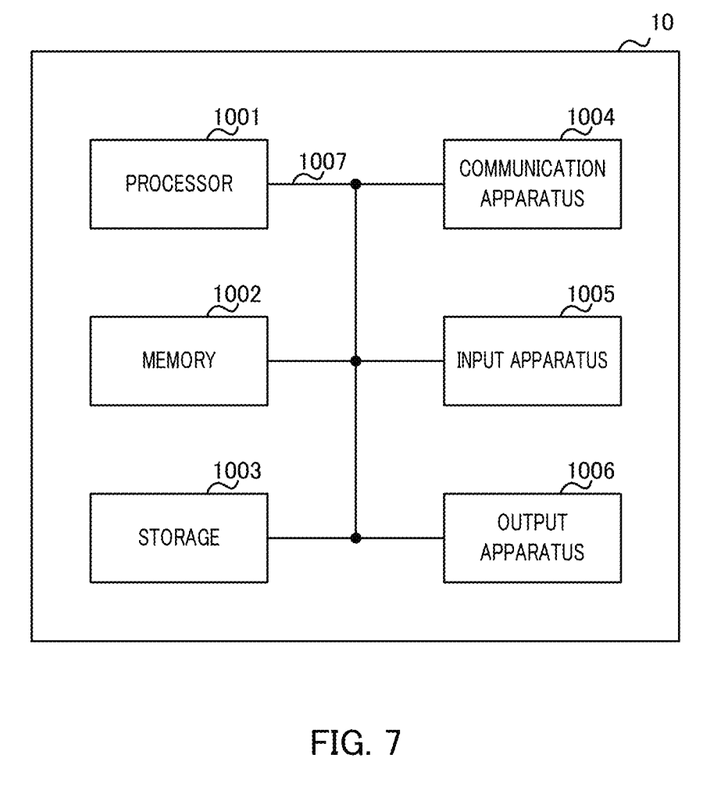
FIG. 7 illustrates an exemplary hardware configuration of a radio base station and the user terminal according to the present invention.

For example, the radio base station, the user terminal, and the like according to an embodiment of the present invention may function as a computer that executes processing of a radio communication method of the present invention. FIG. 7 illustrates an example of a hardware configuration of the radio base station and the user terminal according to an embodiment of the present invention. The radio base station and user terminal as described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of the radio base station and of the user terminal may include one or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in the radio base station and the user terminal are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, connection-cell-selection controlling section 110, communication controlling section 111, and the like as described above may be implemented by processor 1001.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, connection-cell-selection controlling section 110 and communication controlling section 111 of user terminal 10 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. For example, storage section 109 and the like as described above may be implemented by storage 1003. The storage medium as described above may also be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, user data processing section 101, baseband-signal processing section 102, modulation section 103, radio transmission section 104, radio reception section 105, demodulation section 106, separating section 107, and the like may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, the radio base station and the user terminal may include hardware, such as a microprocessor, a digital signal processor (DSP), an ASIC (Application Specific Integrated Circuit), a PLD (Programmable Logic Device), and an FPGA (Field Programmable Gate Array), and the hardware may implement part or all of the functional blocks. For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution), LTE-A (LTE-Advanced), SUPER 3G IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and the Like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head(RRH)). The term "cell" or "sector" denotes part or all of the coverage area of the base station and/or of the base station subsystem that perform the communication service in the coverage. Furthermore, the terms "base station," "eNB," "cell," and "sector" can be interchangeably used in the present specification. The base station may be called a fixed station, a NodeB, an eNodeB (eNB), an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompass a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard. The correction RS may be called a TRS (Tracking RS), a PC-RS (Phase Compensation RS), a PTRS (Phase Tracking RS), or an additional RS. The demodulation RS and the correction RS may be called by other corresponding names, respectively. The demodulation RS and the correction RS may be specified by the same name (for example, demodulation RS).

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, or the like) in the time domain.

The radio frame, the subframe, the slot, and the symbol indicate time units in transmitting signals. The radio frame, the subframe, the slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval).

For example, one subframe, a plurality of continuous subframes, or one slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame is illustrative only, and the number of subframes included in the radio frame, the number of slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and the Like of Aspects)

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

The present patent application claims the benefit of priority based on Japanese Patent Application No. 2017-032475 filed on Feb. 23, 2017, and the entire content of Japanese Patent Application No. 2017-032475 is hereby incorporated by reference.

INDUSTRIAL APPLICABILITY

An aspect of the present invention is useful for a mobile communication system.

REFERENCE SIGNS LIST

10 Terminal
101 User Data Processing Section
102 Baseband-signal Processing Section
103 Modulation Section
104 Radio Transmission Section
105 Radio Reception Section
106 Demodulation Section
107 Separating Section
108 Antenna Section
109 Storage Section
110 Connection-cell-selection Controlling Section
111 Communication Controlling Section
151 Surrounding-cell Detecting Section
152 Reception Quality Measuring Section
153 Position Measuring Section
154 Moving-direction Computing Section
155 Preferred-connection-angle Setting Section
156 Cell-direction-angle Computing Section
157 Preferred-connection-cell Determining Section
158 Correction-value Setting Section
159 Reception Quality Correcting Section
160 Switching-necessity Determining Section
161 Connection Cell Determining Section

The invention claimed is:

1. A terminal configured to communicate with any of a plurality of base stations respectively forming cells in a multilayer cellular radio network, the terminal comprising:
    a reception quality measuring section configured to measure reception quality of each of the cells;
    a reception quality correcting section configured to correct the reception quality of each of the cells based on a positional relationship between each of the cells and the terminal and based on a moving direction of the terminal;
    a connection cell determining section configured to determine a connection cell for the terminal based on the corrected reception quality;
    a moving-direction computing section configured to compute a moving-direction vector of the terminal;
    a preferred-connection-angle setting section configured to set a preferred connection angle range including a direction angle of the moving-direction vector;
    a cell-direction-angle computing section configured to compute a cell direction angle for each of the cells, the cell direction angle being an angle formed by a cell direction vector and the moving-direction vector, the cell direction vector extending from a position of the terminal to a position of each of the cells;
    a preferred-connection-cell determining section configured to determine, as a preferred connection cell, a cell for which the cell direction angle falls within the preferred connection angle range; and
    a correction-value setting section configured to set a correction value for the reception quality so that the preferred connection cell is selected preferentially as a connection target, wherein
    the reception quality correcting section corrects the reception quality of each of the cells by adding the correction value to the reception quality.

2. The terminal according to claim 1, wherein
the correction-value setting section sets a correction value for reducing the reception quality with respect to a non-preferred connection cell being a cell other than the preferred connection cell.

3. The terminal according to claim 2, wherein
the correction-value setting section does not set a correction value for reducing the reception quality or sets a correction value for increasing the reception quality with respect to a connected cell.

4. The terminal according to claim 3, wherein
the correction-value setting section sets a correction value for reducing the reception quality or does not set a correction value for increasing the reception quality with respect to a cell whose cell layer (or Radio Access Technology (RAT)) is different from that of a connected cell.

5. The terminal according to claim 3, wherein
the correction-value setting section does not set a correction value for reducing the reception quality or sets a correction value for increasing the reception quality with respect to a cell whose coverage is greater than a threshold.

6. The terminal according to claim 3, wherein
the correction-value setting section controls a range of the correction value depending on an attribute of the terminal.

7. The terminal according to claim 2, wherein
the correction-value setting section sets a correction value for reducing the reception quality or does not set a correction value for increasing the reception quality with respect to a cell whose cell layer (or Radio Access Technology (RAT)) is different from that of a connected cell.

8. The terminal according to claim 7, wherein
the correction-value setting section does not set a correction value for reducing the reception quality or sets a correction value for increasing the reception quality with respect to a cell whose coverage is greater than a threshold.

9. The terminal according to claim 7, wherein
the correction-value setting section controls a range of the correction value depending on an attribute of the terminal.

10. The terminal according to claim 2, wherein
the correction-value setting section does not set a correction value for reducing the reception quality or sets a correction value for increasing the reception quality with respect to a cell whose coverage is greater than a threshold.

11. The terminal according to claim 10, wherein
the correction-value setting section controls a range of the correction value depending on an attribute of the terminal.

12. The terminal according to claim 2, wherein
the correction-value setting section controls a range of the correction value depending on an attribute of the terminal.

13. The terminal according to claim 1, wherein
the correction-value setting section sets a correction value for increasing the reception quality with respect to the preferred connection cell.

14. The terminal according to claim 13, wherein
the correction-value setting section does not set a correction value for reducing the reception quality or sets a correction value for increasing the reception quality with respect to a connected cell.

15. The terminal according to claim 13, wherein
the correction-value setting section sets a correction value for reducing the reception quality or does not set a correction value for increasing the reception quality with respect to a cell whose cell layer (or Radio Access Technology (RAT)) is different from that of a connected cell.

16. The terminal according to claim 13, wherein
the correction-value setting section does not set a correction value for reducing the reception quality or sets a correction value for increasing the reception quality with respect to a cell whose coverage is greater than a threshold.

17. The terminal according to claim 13, wherein
the correction-value setting section controls a range of the correction value depending on an attribute of the terminal.

18. A cell selection method for a terminal configured to communicate with any of a plurality of base stations respectively forming cells in a multilayer cellular radio network, the cell selection method comprising:
measuring reception quality of each of the cells;
correcting the reception quality of each of the cells based on a positional relationship between each of the cells and the terminal and based on a moving direction of the terminal;
determining a connection cell for the terminal based on the corrected reception quality;
computing a moving-direction vector of the terminal;
setting a preferred connection angle range including a direction angle of the moving-direction vector;
computing a cell direction angle for each of the cells, the cell direction angle being an angle formed by a cell direction vector and the moving-direction vector, the cell direction vector extending from a position of the terminal to a position of each of the cells;
determining, as a preferred connection cell, a cell for which the cell direction angle falls within the preferred connection angle range; and
setting a correction value for the reception quality so that the preferred connection cell is selected preferentially as a connection target, wherein
the terminal corrects the reception quality of each of the cells by adding the correction value to the reception quality.

* * * * *